US012673320B2

(12) United States Patent
Nakahigashi et al.

(10) Patent No.: US 12,673,320 B2
(45) Date of Patent: Jul. 7, 2026

(54) EXHAUST GAS PURIFICATION DEVICE

(71) Applicants: Seiji Nakahigashi, Toyota (JP); Koji
Sugiura, Toyota (JP); Masaru
Kakinohana, Toyota (JP); Kouji
Senda, Seto (JP); Eiji Harada,
Kakegawa (JP); Kengo Shimizu,
Kakegawa (JP); Minoru Ito, Kakegawa
(JP); Masatoshi Ikebe, Kakegawa (JP);
Takeshi Morishima, Kakegawa (JP);
Mitsuhiko Sato, Kakegawa (JP)

(72) Inventors: Seiji Nakahigashi, Toyota (JP); Koji
Sugiura, Toyota (JP); Masaru
Kakinohana, Toyota (JP); Kouji
Senda, Seto (JP); Eiji Harada,
Kakegawa (JP); Kengo Shimizu,
Kakegawa (JP); Minoru Ito, Kakegawa
(JP); Masatoshi Ikebe, Kakegawa (JP);
Takeshi Morishima, Kakegawa (JP);
Mitsuhiko Sato, Kakegawa (JP)

(73) Assignees: **TOYOTA JIDOSHA KABUSHIKI
KAISHA, Toyota (JP); CATALER
CORPORATION**, Kakegawa (JP)

( * ) Notice: Subject to any disclaimer, the term of this
patent is extended or adjusted under 35
U.S.C. 154(b) by 0 days.

(21) Appl. No.: 19/227,141

(22) Filed: Jun. 3, 2025

(65) Prior Publication Data

US 2025/0387783 A1 Dec. 25, 2025

(30) Foreign Application Priority Data

Jun. 21, 2024 (JP) ................................. 2024-100715

(51) Int. Cl.
B01J 35/57 (2024.01)
B01D 46/24 (2006.01)
(Continued)

(52) U.S. Cl.
CPC .......... B01J 35/57 (2024.01); B01D 46/2429
(2013.01); B01D 46/24491 (2021.08);
(Continued)

(58) Field of Classification Search
CPC .. F01N 3/0222; F01N 3/8282; B01D 46/2474
See application file for complete search history.

(56) References Cited

U.S. PATENT DOCUMENTS

2015/0059321 A1* 3/2015 Nakayama ............ F01N 3/0222
60/297
2021/0291102 A1 9/2021 Yuki
2022/0347626 A1 11/2022 Sato et al.

FOREIGN PATENT DOCUMENTS

CN 107073465 A * 8/2017 .............. B01J 35/57
CN 110314683 A * 10/2019 .............. B01J 23/56
(Continued)

*Primary Examiner* — Ngoc T Nguyen
(74) *Attorney, Agent, or Firm* — Oliff PLC

(57) ABSTRACT

An exhaust gas purification device capable of reducing a
pressure loss and capable of improving an exhaust gas
purification performance includes a honeycomb substrate
and an outflow side catalyst. The honeycomb substrate
includes a porous partition wall defining a multiple cells
extending from an inflow side end surface to an outflow side
end surface. The outflow side catalyst is in an inner region
on the outflow cell side of the partition wall in an outflow
side catalyst-disposed range extending from an outflow side
end of the partition wall to a position apart toward an inflow
side along an extending direction.

2 Claims, 5 Drawing Sheets

(51) Int. Cl.

| | | |
|---|---|---|
| *B01D 53/94* | (2006.01) |
| *B01J 23/10* | (2006.01) |
| *B01J 23/42* | (2006.01) |
| *B01J 23/46* | (2006.01) |
| *B01J 37/02* | (2006.01) |
| *B01J 37/08* | (2006.01) |
| *F01N 3/28* | (2006.01) |

(52) U.S. Cl.
CPC ... *B01D 46/24492* (2021.08); *B01D 46/2462* (2013.01); *B01D 46/2474* (2013.01); *B01D 46/2482* (2021.08); *B01D 46/2484* (2021.08); *B01D 53/9413* (2013.01); *B01J 23/10* (2013.01); *B01J 23/42* (2013.01); *B01J 23/464* (2013.01); *B01J 37/0213* (2013.01); *B01J 37/0236* (2013.01); *B01J 37/024* (2013.01); *B01J 37/088* (2013.01); *F01N 3/28* (2013.01); *B01D 2255/1021* (2013.01); *B01D 2255/1025* (2013.01); *B01D 2255/407* (2013.01); *B01D 2255/908* (2013.01); *B01D 2255/9155* (2013.01); *B01D 2257/404* (2013.01); *B01D 2258/01* (2013.01); *B01D 2279/30* (2013.01)

(56) References Cited

FOREIGN PATENT DOCUMENTS

| JP | 2021-146287 A | 9/2021 |
| JP | 2022-170972 A | 11/2022 |

* cited by examiner

EXHAUST GAS PURIFICATION DEVICE

CROSS REFERENCE TO RELATED APPLICATIONS

The present application claims priority from Japanese patent application JP 2024-100715 filed on Jun. 21, 2024, the entire content of which is hereby incorporated by reference into this application.

BACKGROUND

Description of Related Art

The present disclosure relates to an exhaust gas purification device that includes a catalyst in a filter having a wall flow structure.

Background Art

An exhaust gas from an internal combustion engine in, for example, an automobile contains a particulate matter (hereinafter abbreviated as "PM" in some cases) and the like, which cause air pollution. As a filter having the wall flow structure to remove the PM from the exhaust gas, a gasoline particulate filter (hereinafter abbreviated as "GPF" in some cases) and the like have been known. Meanwhile, the exhaust gas also contains harmful components, such as carbon monoxide (CO), hydrocarbons (HC), and nitrogen oxides (NOx). The harmful components can be removed from the exhaust gas by a catalyst that is disposed at a partition wall of a filter and contains a catalyst metal. Recently, to remove both of the PM and the harmful components from the exhaust gas, an exhaust gas purification device including a catalyst at a partition wall of a filter has been used. As such a device, for example, a device has been known in which an inflow cell side catalyst layer is disposed on an inflow cell side surface in an inflow cell side catalyst region extending from an inflow side end of a partition wall to a position apart toward an outflow side along an extending direction, and at a reference position in the inflow cell side catalyst region of the partition wall, a proportion of a portion filled with the inflow cell side catalyst layer in pores in an inner region up to a depth of 50% of a thickness of the partition wall is 40% or less (JP 2022-170972 A).

SUMMARY

In the conventional exhaust gas purification device, conditions of the structure in which the catalyst is disposed in a range on the outflow side extending from the outflow side end of the partition wall to the position apart toward the inflow side along the extending direction have not been specified. In view of this, the properties of pressure loss and exhaust gas purification performance are insufficient. The present disclosure is made in consideration of the above-described problem, and provides an exhaust gas purification device capable of reducing a pressure loss and capable of improving an exhaust gas purification performance.

To solve the above-described problem, an exhaust gas purification device of the present disclosure comprises a honeycomb substrate and an outflow side catalyst. The honeycomb substrate includes a porous partition wall defining a plurality of cells extending from an inflow side end surface to an outflow side end surface. The plurality of cells include an inflow cell and an outflow cell adjacent across the partition wall. The inflow cell has an open inflow side end and a sealed outflow side end. The outflow cell has a sealed inflow side end and an open outflow side end. The outflow side catalyst is disposed in an inner region on the outflow cell side of the partition wall in an outflow side catalyst-disposed range extending from an outflow side end of the partition wall to a position apart toward an inflow side along an extending direction. In the outflow side catalyst-disposed range of the partition wall, a proportion of a portion filled with the outflow side catalyst in pores in an outflow cell side surface region up to a depth of a quarter of a thickness of the partition wall from a surface on the outflow cell side of the partition wall is 61% or more and 78% or less.

Effect

According to the present disclosure, the pressure loss can be reduced and the exhaust gas purification performance can be improved.

DETAILED DESCRIPTION OF THE EMBODIMENTS

The following describes an embodiment according to an exhaust gas purification device of the present disclosure. In the exhaust gas purification device according to the embodiment, an "inflow side" means a side from which an exhaust gas flows in and an "outflow side" means a side from which the exhaust gas flows out. An "extending direction of a partition wall" means a direction in which the partition wall extends. An axial direction of a honeycomb substrate and a cell extending direction (direction in which the cell extends) are usually approximately same as the extending direction of the partition wall. A "thickness direction of the partition wall" means a direction perpendicular to a surface on a cell (inflow cell and outflow cell) side of the partition wall. A "width direction of the partition wall" means a direction perpendicular to both of the extending direction and the thickness direction of the partition wall. In the following description, the "extending direction" means the extending direction of the partition wall, and a direction approximately same as the axial direction of the honeycomb substrate and the cell extending direction. The "thickness direction" means the thickness direction of the partition wall. The "width direction" means the width direction of the partition wall.

Figure 1:
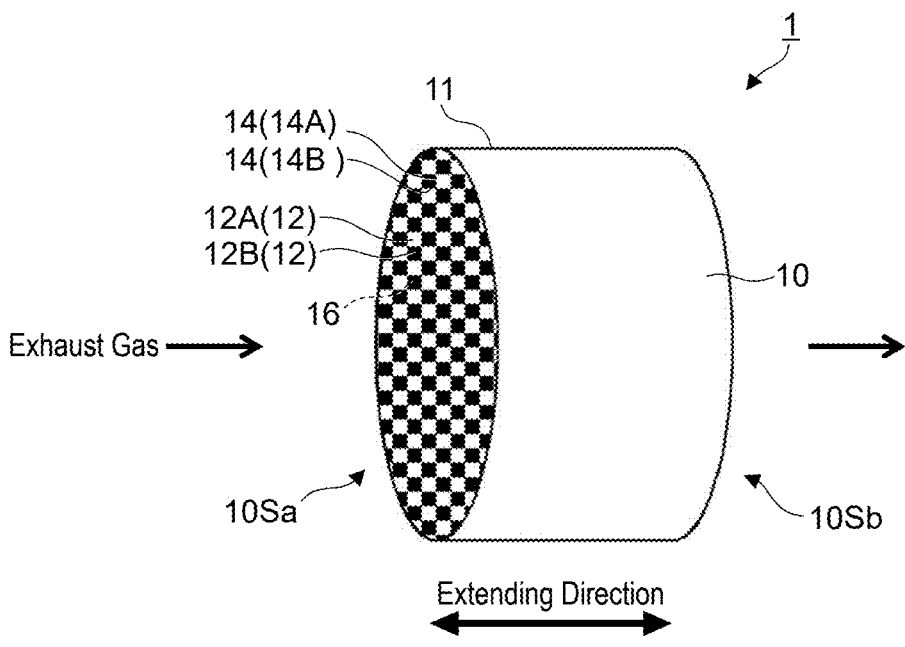
FIG. 1 is a perspective view schematically illustrating an exhaust gas purification device according to one embodiment.
Figure 2:
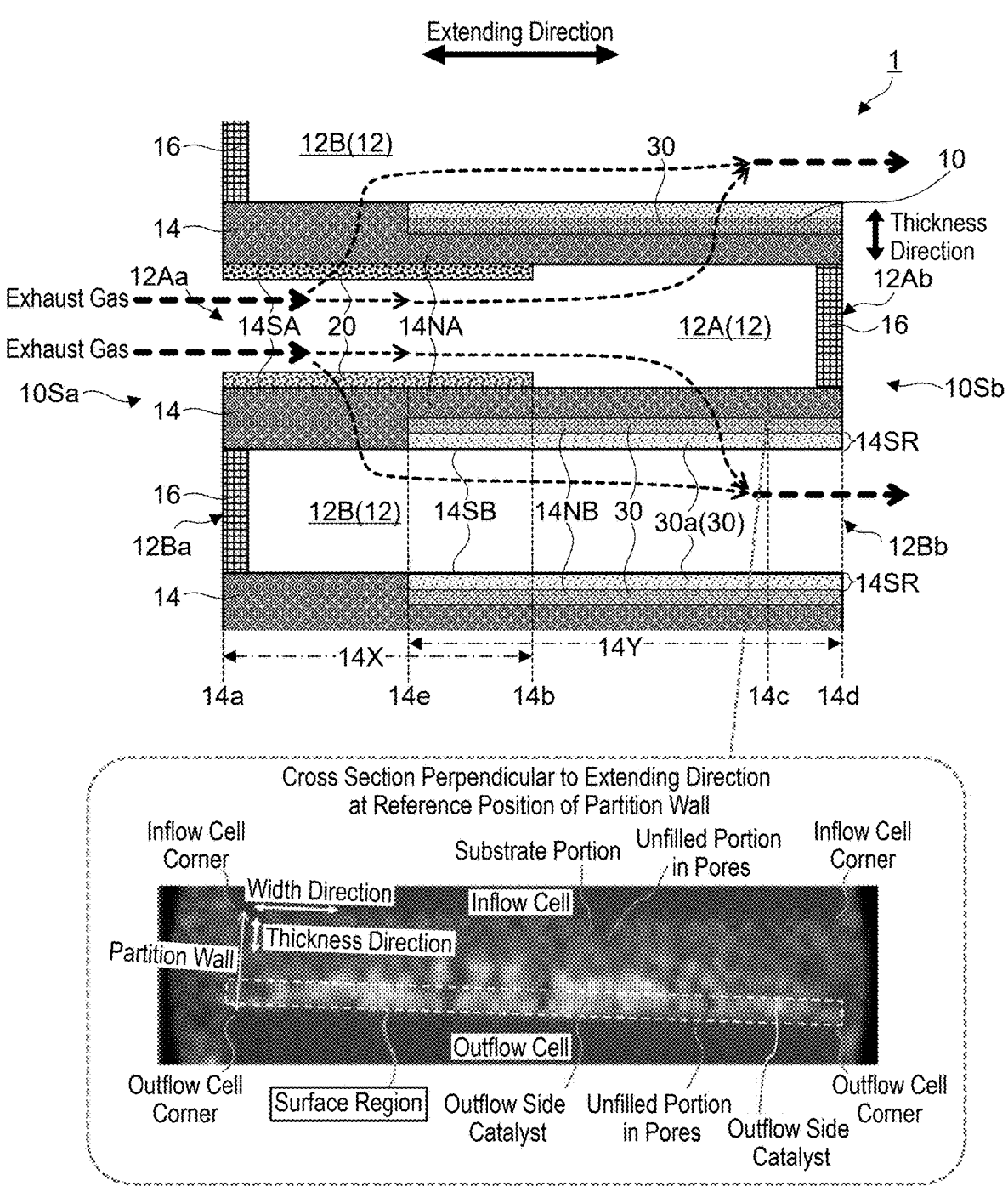
FIG. 2 is a cross-sectional view schematically illustrating a main part of a cross section parallel to an extending direction of the exhaust gas purification device according to the one embodiment.

First, an exhaust gas purification device according to one embodiment will be described as an example. FIG. 1 is a perspective view schematically illustrating the exhaust gas purification device according to the one embodiment. FIG. 2 is a cross-sectional view schematically illustrating a main part of a cross section parallel to the extending direction of the exhaust gas purification device according to the one embodiment. In the dashed frame in FIG. 2, an adjusted cross-sectional image of a cross-sectional image taken by X-ray CT indicating a region between adjacent corners of an inflow cell 12A (outflow cell 12B) in a cross section perpendicular to the extending direction at a reference position 14c of an outflow side catalyst-disposed range 14Y of the partition wall 14 is shown.

As illustrated in FIG. 1 and FIG. 2, an exhaust gas purification device 1 according to the one embodiment includes a honeycomb substrate 10, sealing portions 16, an inflow side catalyst 20, and an outflow side catalyst 30. The honeycomb substrate 10 is a substrate in which a cylindrical-shaped frame portion 11 and a partition wall 14 partitioning a space inside the frame portion 11 into a honeycomb shape are integrally formed. The partition wall 14 is a porous body that defines a plurality of cells 12 extending from an inflow side end surface 10Sa to an outflow side end surface 10Sb of the honeycomb substrate 10. The partition wall 14 includes a plurality of wall portions 14A arranged to be mutually separated and parallel and a plurality of wall portions 14B orthogonal to the plurality of wall portions 14A and arranged to be mutually separated and parallel such that cross-sectional shapes perpendicular to the extending direction of the plurality of cells 12 have rectangular shapes. A cross section of the partition wall 14 perpendicular to the extending direction has a grid shape. The plurality of cells 12 include inflow cells 12A and outflow cells 12B adjacent across the partition wall 14. The inflow cell 12A has an open inflow side end 12Aa and an outflow side end 12Ab sealed by the sealing portion 16. The outflow cell 12B has an inflow side end 12Ba sealed by the sealing portion 16 and an open outflow side end 12Bb. Cross-sectional shapes of the inflow cell 12A and the outflow cell 12B perpendicular to the extending direction have rectangular shapes, and have four corners.

The inflow side catalyst 20 is disposed on a surface 14SA on the inflow cell 12A side of the partition wall 14 in an inflow side catalyst-disposed range 14X, which extends from an inflow side end 14a of the partition wall 14 to a position 14b apart by a distance of 50% of a length in the extending direction of the partition wall 14 toward the outflow side along the extending direction. The inflow side catalyst 20 includes a carrier in powder form, catalyst metal particles containing at least one of platinum (Pt) or palladium (Pd) supported by the carrier, and an OSC material. The outflow side catalyst 30 is disposed in pores in an inner region 14NB on the outflow cell 12B side of the partition wall 14 in an outflow side catalyst-disposed range 14Y, which extends from an outflow side end 14d of the partition wall 14 to a position 14e apart by a distance of 70% of a length in the extending direction of the partition wall 14 toward the inflow side along the extending direction. The outflow side catalyst 30 includes a carrier in powder form, catalyst metal particles containing rhodium (Rh) supported by the carrier, and an OSC material.

At the reference position 14c in the extending direction of the outflow side catalyst-disposed range 14Y of the partition wall 14, a proportion of a portion filled with the outflow side catalyst 30 in the pores in an outflow cell side surface region 14SR up to the depth of a quarter of the thickness of the partition wall 14 from a surface 14SB on the outflow cell 12B side of the partition wall 14 is 61% or more and 78% or less. The reference position 14c of the outflow side catalyst-disposed range 14Y of the partition wall 14 is a position apart by a predetermined distance from the outflow side end 14d of the partition wall 14 toward the inflow side along the extending direction (for example, a position on the outflow side as far as possible in a range not overlapping with the disposition region of the sealing portion 16 in the extending direction). Specifically, the proportion of the portion filled with the outflow side catalyst 30 in the pores in the outflow cell side surface region 14SR at the reference position 14c of the outflow side catalyst-disposed range 14Y of the partition wall 14 is obtained as the proportion of the portion filled with the outflow side catalyst 30 in the pores in the outflow cell side surface region 14SR in a reference region of the outflow side catalyst-disposed range 14Y of the partition wall 14, when the reference region is set to a region of the partition wall 14 between adjacent corners of the inflow cell 12A (outflow cell 12B) in the range of ±1 mm in the extending direction from the reference position 14c of the outflow side catalyst-disposed range 14Y of the partition wall 14.

In the exhaust gas purification device 1 according to the one embodiment, the proportion of the portion filled with the outflow side catalyst 30 in the pores in the outflow cell side surface region 14SR at the reference position 14c of the outflow side catalyst-disposed range 14Y of the partition wall 14 is 61% or more, thereby causing the amount of the outflow side catalyst 30 present in the outflow cell side surface region 14SR of the outflow side catalyst-disposed range 14Y of the partition wall 14 to be sufficient. Therefore, the effect of the outflow side catalyst 30 present in the outflow cell side surface region 14SR purifying the exhaust gas flowing into the outflow cell 12B is sufficiently obtained, and the exhaust gas purification performance, especially in the gas diffusion-controlling region, can be improved. On the other hand, since the proportion of the portion filled with the outflow side catalyst 30 in the pores in the outflow cell side surface region 14SR at the reference position 14c of the outflow side catalyst-disposed range 14Y of the partition wall 14 is 78% or less, communication holes from the inflow cell 12A side to the outflow cell 12B side in the outflow side catalyst-disposed range 14Y of the partition wall 14 can be sufficiently ensured. Therefore, it is sufficiently easy for the exhaust gas to pass through the outflow side catalyst-disposed range 14Y of the partition wall 14 from the inflow cell 12A side to the outflow cell 12B side. This can reduce a pressure loss. Furthermore, since the effect of the outflow side catalyst 30 purifying the exhaust gas as the exhaust gas passes through the partition wall 14 is sufficiently obtained, the exhaust gas purification performance, especially in the gas diffusion-controlling region, can be improved. Subsequently, each configuration of the exhaust gas purification device according to the embodiment will be described in detail.

1. Honeycomb Substrate

The honeycomb substrate is a substrate in which the frame portion and the partition wall partitioning the space inside the frame portion into the honeycomb shape are integrally formed. An axial length of the honeycomb substrate is, for example, 10 mm or more and 500 mm or less in some embodiments. As a capacity of the honeycomb substrate (total volume of the cells), a common capacity can be used. A material of the honeycomb substrate is not specifically limited, and examples thereof include a ceramic, such as cordierite. A length in the extending direction of the partition wall is usually approximately the same as the axial length of the honeycomb substrate. A thickness of the partition wall is, for example, 50 μm or more and 2000 μm or less in some embodiments. The partition wall has a porous structure comprising pores including a pore through which the exhaust gas can pass. A porosity of the partition wall is, for example, 40% or more and 70% or less in some embodiments. This is because the pressure loss can be effectively suppressed and a sufficient mechanical strength can be ensured. A mean pore size of the pores of the partition wall (mean pore size of the pores in a partition wall alone) is, for example, 1 μm or more and 60 μm or less in some embodiments. This is because the sufficient PM trap performance can be obtained and the pressure loss can be sufficiently suppressed. The "mean pore size of the pores of the partition wall" means, for example, one measured by a method of mercury penetration.

The inflow cells and the outflow cells are formed by partitioning the space inside the frame portion with the partition wall, and adjacent across the partition wall. The inflow cells and the outflow cells are usually surrounded by the partition wall in a direction perpendicular to the extending direction. The inflow cell has the outflow side end usually sealed by the sealing portion. The outflow cell has the inflow side end usually sealed by the sealing portion. A length in the extending direction of the sealing portion is, for example, 2 mm or more and 20 mm or less in some embodiments. Examples of cross-sectional shapes perpendicular to the extending direction of the inflow cells and the outflow cells include a rectangular shape, such as a square. Cross-sectional areas perpendicular to the extending direction of the inflow cells and the outflow cells are, for example, 1 mm$^2$ or more and 7 mm$^2$ or less. Examples of an arrangement aspect of the inflow cells and the outflow cells include, as in the one embodiment, an aspect like a checkered pattern in which the inflow cells and the outflow cells are arranged in alternation.

2. Outflow Side Catalyst and Proportion of Portion Filled with Outflow Side Catalyst in Pores in Outflow Cell Side Surface Region The outflow side catalyst is disposed in an inner region on the outflow cell side of the partition wall in the outflow side catalyst-disposed range of the partition wall. The outflow side catalyst-disposed range of the partition wall is not specifically limited insofar as it is a range extending from the outflow side end of the partition wall to a position apart by a predetermined distance toward the inflow side along the extending direction. For example, the outflow side catalyst-disposed range of the partition wall may be a range extending from the outflow side end of the partition wall to a position apart by a distance of 50% or more and 100% or less of the length in the extending direction of the partition wall toward the inflow side along the extending direction, may be a range extending to a position apart by a distance of 55% or more and 90% or less of the length in the extending direction of the partition wall, and may be a range extending to a position apart by a distance of 60% or more and 80% or less of the length in the extending direction of the partition wall. This is because the pressure loss can be effectively reduced and the exhaust gas purification performance can be effectively improved.

In the outflow side catalyst-disposed range of the partition wall, the proportion of the portion filled with the outflow side catalyst in the pores in the outflow cell side surface region up to the depth of a quarter of the thickness of the partition wall from the surface on the outflow cell side of the partition wall is 61% or more and 78% or less. The "proportion of the portion filled with the outflow side catalyst in the pores in the outflow cell side surface region" means, for example, the proportion of the portion filled with the outflow side catalyst in the pores in the outflow cell side surface region at the reference position in the extending direction of the outflow side catalyst-disposed range of the partition wall. While the reference position of the outflow side catalyst-disposed range of the partition wall is not specifically limited insofar as it is any position in the extending direction of the outflow side catalyst-disposed range of the partition wall, the reference position may be a position on the outflow side as far as possible in a range not overlapping with the disposition region of the sealing portion that seals the outflow side end of the inflow cell in the extending direction. This is because such a position has a large influence on the pressure loss and the exhaust gas purification performance. Examples of a method for obtaining the proportion of the portion filled with the outflow side catalyst in the pores in the outflow cell side surface region at the reference position of the outflow side catalyst-disposed range of the partition wall include a method in which it is obtained as the proportion of the portion filled with the outflow side catalyst in the pores in the outflow cell side surface region in a reference region of the outflow side catalyst-disposed range of the partition wall, while setting the reference region to the region of the partition wall between adjacent corners of the inflow cell (outflow cell) in the range of ±1 mm (however, limited to a range included in the outflow side catalyst-disposed range of the partition wall) in the extending direction from the reference position of the outflow side catalyst-disposed range of the partition wall.

As a structure in which the proportion of the portion filled with the outflow side catalyst in the pores in the outflow cell side surface region at the reference position of the outflow side catalyst-disposed range of the partition wall is 61% or more and 78% or less, a structure in which the proportion of the portion filled with the outflow side catalyst in the pores in the outflow cell side surface region in the entire range in the extending direction of the outflow side catalyst-disposed range of the partition wall is 61% or more and 78% or less may be used. This is because the pressure loss can be effectively reduced and the exhaust gas purification performance can be effectively improved. Examples of a method for obtaining the proportion of the portion filled with the outflow side catalyst in the pores in the outflow cell side surface region in the entire range in the extending direction of the outflow side catalyst-disposed range of the partition wall include a method in which it is obtained as the proportion of the portion filled with the outflow side catalyst in the pores in the outflow cell side surface region in a calculation region in the entire range in the extending direction of the outflow side catalyst-disposed range of the partition wall, while setting the calculation region to the region of the partition wall between adjacent corners of the inflow cell (outflow cell) in the entire range in the extending direction of the outflow side catalyst-disposed range of the partition wall.

The outflow side catalyst usually includes catalyst metal particles and a carrier that supports the catalyst metal particles. A mass ratio of catalyst metal particles to a total mass of the catalyst metal particles and the carrier is not specifically limited, and for example, it is 0.01 mass % or more and 10 mass % or less in some embodiments. A material of the catalyst metal particles is not specifically limited, and examples thereof include platinum (Pt), palladium (Pd), and rhodium (Rh). A mean particle size of the catalyst metal particles is not specifically limited, and for example, it is 0.1 nm or more and 20 nm or less in some embodiments. The mean particle size of the catalyst metal particles means, for example, an average value obtained from particle sizes measured by a transmission electron microscope (TEM). A content of the catalyst metal particles is not specifically limited, and it is 0.01 g or more and 2 g or less per liter of the honeycomb substrate in some embodiments. Here, the content of the catalyst metal particles per liter of the substrate volume means a value obtained by dividing the mass of the catalyst metal particles contained in the outflow side catalyst by the volume of a part of the honeycomb substrate in the axial direction having the axial length which is the same as the length in the extending direction of the outflow side catalyst-disposed range of the partition wall. A material of the carrier is not specifically limited, and examples thereof include a metallic oxide, such as alumina, ceria ($CeO_2$), and zirconia ($ZrO_2$), and a solid solution, such as a ceria-zirconia ($CeO_2$—$ZrO_2$) complex oxide. A shape of the carrier is not specifically limited, and for example, the carrier is in powder form in some embodiments. A mean particle size D50 of the carrier in powder form is not specifically limited, and for example, it is 1 μm or more and 15 μm or less in some embodiments. The mean particle size D50 is obtained by, for example, laser diffraction and scattering.

The outflow side catalyst may further include, for example, a promotor or the like, such as an oxygen storage capacity (OSC) material. A material of the promotor is, for example, a material similar to that of the carrier. A shape of the promotor is, for example, a shape similar to that of the carrier. A mean particle size D50 of the promotor in powder form is not specifically limited, and examples thereof include a mean particle size similar to that of the carrier in powder form. As a mass ratio of the promotor to a total mass of the catalyst metal particles, the carrier, and the promotor, a common mass ratio can be used. While a density of the outflow side catalyst is not specifically limited, for example, it is 5 g/L or more and 100 g/L or less in some embodiments. The "density of the outflow side catalyst" means a value obtained by dividing the mass of the outflow side catalyst by the volume of a part of the honeycomb substrate in the axial direction having the axial length which is the same as the length in the extending direction of the outflow side catalyst-disposed range of the partition wall.

A method for forming the outflow side catalyst is not specifically limited, and examples of the method include a method in which, after preparing a slurry for the outflow side catalyst by mixing the catalyst metal particles and the carrier in powder form with a solvent, the slurry for the outflow side catalyst is supplied to an inner region (pores present in the inner region) on the outflow cell side of the partition wall in the outflow side catalyst-disposed range of the partition wall, and subsequently, the slurry for the outflow side catalyst is dried and fired. In such a method, the slurry for the outflow side catalyst may contain additional components such as a promotor, a binder, and an additive as necessary in addition to the catalyst metal particles and the carrier, and the solvent (such as ion exchanged water). Examples of the additive include a pH adjuster, such as acetic acid. The method for preparing the slurry for the outflow side catalyst is not specifically limited, and examples thereof include the following method. First, a carrier in powder form is immersed in a solution (such as an aqueous solution) containing a catalytic metal salt or a catalytic metal complex, and subsequently they are dried and fired, thus preparing a catalyst metal supporting powder in which a catalyst metal is supported on the carrier. Next, a solvent is added to the catalyst metal supporting powder, and an additional component is further added thereto as necessary, and they are sufficiently stirred and wet-ground so as to have a mean particle size D50 of the solid components as a desired value. Thus, the slurry for the outflow side catalyst is prepared. The mean particle size D50 of the solid components in the slurry for the outflow side catalyst is not specifically limited, and it may be a common mean particle size. The method for supplying the slurry for the outflow side catalyst is not specifically limited, and example thereof include a method in which the honeycomb substrate is immersed in the slurry for the outflow side catalyst from the outflow side and taken out from the slurry for the outflow side catalyst after the elapse of a predetermined period. As the method for supplying the slurry for the outflow side catalyst on the partition wall, a method in which the slurry for the outflow side catalyst is blown off using a blower or the like, for example, such that the slurry for the outflow side catalyst is not supplied to parts where the catalyst is unnecessary in the inner region and on the surface of the partition wall may be used. As the drying condition and the firing condition, common conditions can be used.

The proportion of the portion filled with the outflow side catalyst in the pores in the outflow cell side surface region in the outflow side catalyst-disposed range of the partition wall can be adjusted by methods for adjusting concentrations of an additive such as a pH adjuster, such as acetic acid, and other solid components in the slurry, the mean particle size D50 of the solid components in the slurry, the properties such as dispersion state and viscosity of the solid components in the slurry, the supply amount of the slurry, the supply method of the slurry, the drying condition, the firing condition, and the like.

3. Others

The exhaust gas purification device includes the honeycomb substrate and the outflow side catalyst. The exhaust gas purification device usually further includes sealing portions sealing outflow side ends of the inflow cells and sealing portions sealing inflow side ends of the outflow cells. The exhaust gas purification device may further include an inflow side catalyst disposed in an inflow side catalyst-disposed range extending from the inflow side end of the partition wall to a position apart by a predetermined distance toward the outflow side along the extending direction, as in the one embodiment, or may be one without the inflow side catalyst. In the exhaust gas purification device, regardless of the presence or absence of the inflow side catalyst, effects of reducing the pressure loss and improving the exhaust gas purification performance can be obtained depending on the configuration of the outflow side catalyst.

The inflow side catalyst is disposed at least one of on the inflow cell side surface or in the inflow cell side inner region (pores present in the inner region) of the partition wall in the inflow side catalyst-disposed range of the partition wall. The inflow side catalyst-disposed range of the partition wall may be, for example, a range extending from the inflow side end of the partition wall to a position apart by a distance of 80% or less of the length in the extending direction of the partition wall toward the outflow side along the extending direction. This is because an increase in the pressure loss can be suppressed. These ranges may include a range extending along the extending direction to a position overlapping with the outflow side catalyst-disposed range. This is because it can avoid the exhaust gas passing through a region where the catalyst is not disposed in the partition wall. The inflow side catalyst usually includes the catalyst metal particles and the carrier supporting the catalyst metal particles. The catalyst metal particles and the carrier are similar to the catalyst metal particles and the carrier included in the outflow side catalyst, respectively. The inflow side catalyst may include a promotor or the like similar to that of the outflow side catalyst. The "density of the inflow side catalyst" means a value obtained by dividing the mass of the inflow side catalyst by the volume of a part of the honeycomb substrate in the axial direction having the axial length which is the same as the length in the extending direction of the inflow side catalyst-disposed range of the partition wall.

EXAMPLES

The following further specifically describes the exhaust gas purification device according to the embodiment with examples and comparative examples.

Example 1

An exemplary exhaust gas purification device according to the one embodiment was produced. Specifically, first, a GPF that included the following honeycomb substrate 10 and sealing portions 16 and was not provided with a catalyst was prepared.

Material of Honeycomb Substrate: Cordierite
    Size of Honeycomb Substrate: Outer Diameter×Axial Length=117 mm×122 mm
    Thickness of Partition Wall: 240 μm
    Porosity of Partition Wall (Proportion of Pores in Partition Wall Alone): 61%
    Mean Pore Size of Pores in Partition Wall (Mean Pore Size of Pores in Partition Wall Alone): 7 μm
    Cell Density: 200 cells per square inch
    Length in Extending Direction of Sealing Portion: 5 mm Next, a carrier with catalyst in which catalyst metal particles were supported by a carrier in powder form was mixed with a solvent, thus preparing a slurry for the outflow side catalyst. Specifically, a ceria-zirconia complex oxide (carrier) in powder form was immersed in an aqueous solution containing Rh hydroxide (catalytic metal salt), and subsequently, they were dried and fired, thus preparing a Rh supporting powder including rhodium (Rh) supported on the ceria-zirconia complex oxide in powder form. Next, alumina (promotor), acetic acid (pH adjuster), and a binder, as well as an ion exchanged water (solvent) were added to the Rh supporting powder, and they were sufficiently stirred and wet-ground. Thus, the slurry for the outflow side catalyst was prepared. At this time, acetic acid (pH adjuster) was added to the slurry for the outflow side catalyst such that a concentration of acetic acid in the slurry for the outflow side catalyst was 1 weight %.

Next, the slurry for the outflow side catalyst was poured into the outflow cell 12B from the outflow side end 12Bb in a supply amount such that the density of the outflow side catalyst 30 was 52 g/L, thereby supplying the slurry for the outflow side catalyst to the inner region 14NB on the outflow cell 12B side of the partition wall 14 in the outflow side catalyst-disposed range 14Y of the partition wall 14. The outflow side catalyst-disposed range 14Y of the partition wall 14 is a range extending from the outflow side end 14d of the partition wall 14 to the position 14e apart by a distance of 70% of the length in the extending direction of the partition wall 14 toward the inflow side along the extending direction. Subsequently, the honeycomb substrate 10 to which the slurry for the outflow side catalyst was supplied was dried by heating at 120° C. for two hours using a dryer to remove water content, and subsequently, the honeycomb substrate 10 was fired at 500° C. for two hours using an electric furnace. Thus, the outflow side catalyst 30 was formed.

Next, a carrier with catalyst in which catalyst metal particles were supported by a carrier in powder form was mixed with a solvent, thus preparing a slurry for the inflow side catalyst. Specifically, a ceria-zirconia complex oxide (carrier) in powder form was immersed in an aqueous solution containing Pt nitrate (catalytic metal salt), and subsequently, they were dried and fired, thus preparing a Pt supporting powder including platinum (Pt) supported on the ceria-zirconia complex oxide in powder form. Next, acetic acid (pH adjuster), and a binder, as well as an ion exchanged water (solvent) were added to the Pt supporting powder, and they were sufficiently stirred and wet-ground. Thus, the slurry for the inflow side catalyst was prepared. At this time, acetic acid (pH adjuster) was added to the slurry for the inflow side catalyst such that a concentration of acetic acid in the slurry for the inflow side catalyst was 1 weight %.

Next, the slurry for the inflow side catalyst was poured into the inflow cell 12A from the inflow side end 12Aa in a supply amount such that the density of the inflow side catalyst 20 was a desired value, thereby supplying the slurry for the inflow side catalyst to the surface 14SA on the inflow cell 12A side of the partition wall 14 in the inflow side catalyst-disposed range 14X of the partition wall 14. The inflow side catalyst-disposed range 14X of the partition wall 14 is a range extending from the inflow side end 14a of the partition wall 14 to the position 14b apart by a distance of 50% of the length in the extending direction of the partition wall 14 toward the outflow side along the extending direction. Subsequently, the honeycomb substrate 10 to which the slurry for the inflow side catalyst was supplied was dried by heating at 120° C. for two hours using a dryer to remove water content, and subsequently, the honeycomb substrate 10 was fired at 500° C. for two hours using an electric furnace. Thus, the inflow side catalyst 20 was formed. As described above, the exhaust gas purification device 1 was produced.

Examples 2 and 3 and Comparative Examples 1 and 2

In Examples 2 and 3 and Comparative Example 1, the exhaust gas purification devices 1 were produced with the producing method similar to that of Example 1, except that when the slurry for the outflow side catalyst was prepared, acetic acid (pH adjuster) was added to the slurry for the outflow side catalyst such that the concentrations of acetic acid in the slurry for the outflow side catalyst were 4 weight % (Example 2), 5 weight % (Example 3), and 6 weight %

(Comparative Example 1), respectively. In Comparative Example 2, the exhaust gas purification device 1 was produced with the producing method similar to that of Example 1, except that when the slurry for the outflow side catalyst was supplied to the inner region 14NB on the outflow cell 12B side of the partition wall 14 in the outflow side catalyst-disposed range 14Y of the partition wall 14, the supply amount of the slurry for the outflow side catalyst was adjusted such that the density of the outflow side catalyst 30 was 109 g/L.

Evaluation

For the exhaust gas purification devices 1 of Examples 1 to 3 and Comparative Examples 1 and 2, the cross section perpendicular to the extending direction at the reference position 14c in the extending direction of the outflow side catalyst-disposed range 14Y of the partition wall 14 was observed. Then, an initial pressure loss and the exhaust gas purification performance after a durability test relative to the proportion of the portion filled with the outflow side catalyst 30 in the pores in the outflow cell side surface region 14SR in the outflow side catalyst-disposed range 14Y of the partition wall 14 were evaluated. The reference position 14c in the outflow side catalyst-disposed range 14Y of the partition wall 14 is a position apart by a distance of 15 mm from the outflow side end 14d of the partition wall 14 toward the inflow side along the extending direction. The outflow cell side surface region 14SR of the outflow side catalyst-disposed range 14Y of the partition wall 14 is a region up to the depth of a quarter (60 μm) of the thickness of the partition wall 14 from the surface 14SB on the outflow cell 12B side in the outflow side catalyst-disposed range 14Y of the partition wall 14.

(Cross Section Observation)

Figure 3:
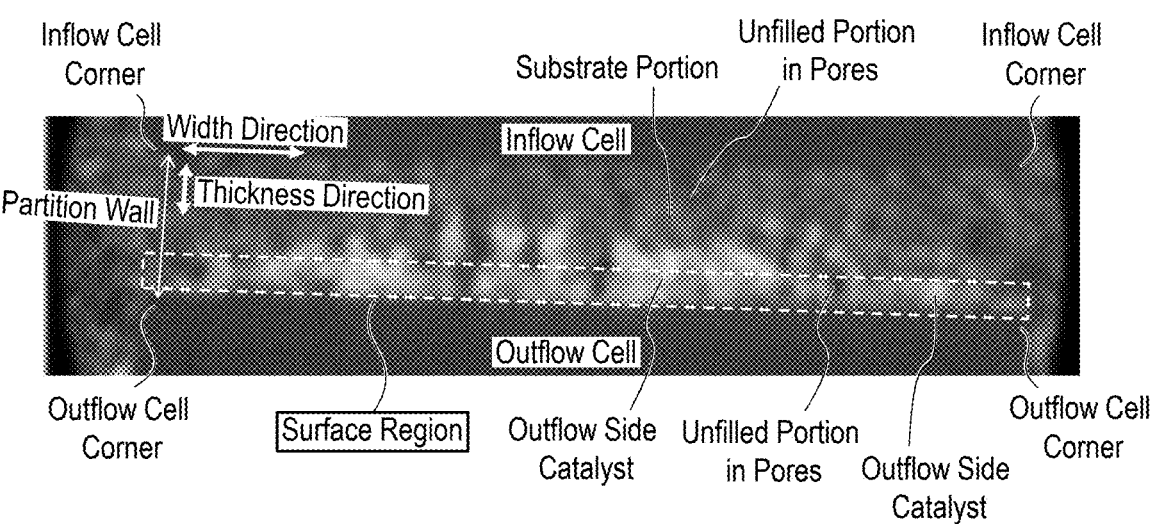
FIG. 3 is an adjusted cross-sectional image of a cross-sectional image taken by X-ray CT indicating a region between adjacent corners of an inflow cell in a cross section perpendicular to the extending direction at a reference position of an outflow side catalyst-disposed range of a partition wall according to an exhaust gas purification device of Example 1.

In the exhaust gas purification devices 1 of Examples 1 to 3 and Comparative Examples 1 and 2, a region between adjacent corners of the inflow cell 12A (outflow cell 12B) in the cross section perpendicular to the extending direction at the reference position 14c of the outflow side catalyst-disposed range 14Y of the partition wall 14 was photographed by X-ray CT. FIG. 3 is an adjusted cross-sectional image of a cross-sectional image taken by X-ray CT indicating a region between adjacent corners of the inflow cell in the cross section perpendicular to the extending direction at the reference position of the outflow side catalyst-disposed range of the partition wall according to the exhaust gas purification device of Example 1. In this cross-sectional image, along with the partition wall 14, the inflow cell 12A and the outflow cell 12B, portions not filled with the outflow side catalyst 30 (unfilled portions) in the pores of the partition wall 14, the substrate portion of the partition wall 14, and the outflow side catalyst 30 are illustrated.

(Proportion of Portion filled with Outflow Side Catalyst in Pores in Outflow Cell Side Surface Region)

Figure 4:
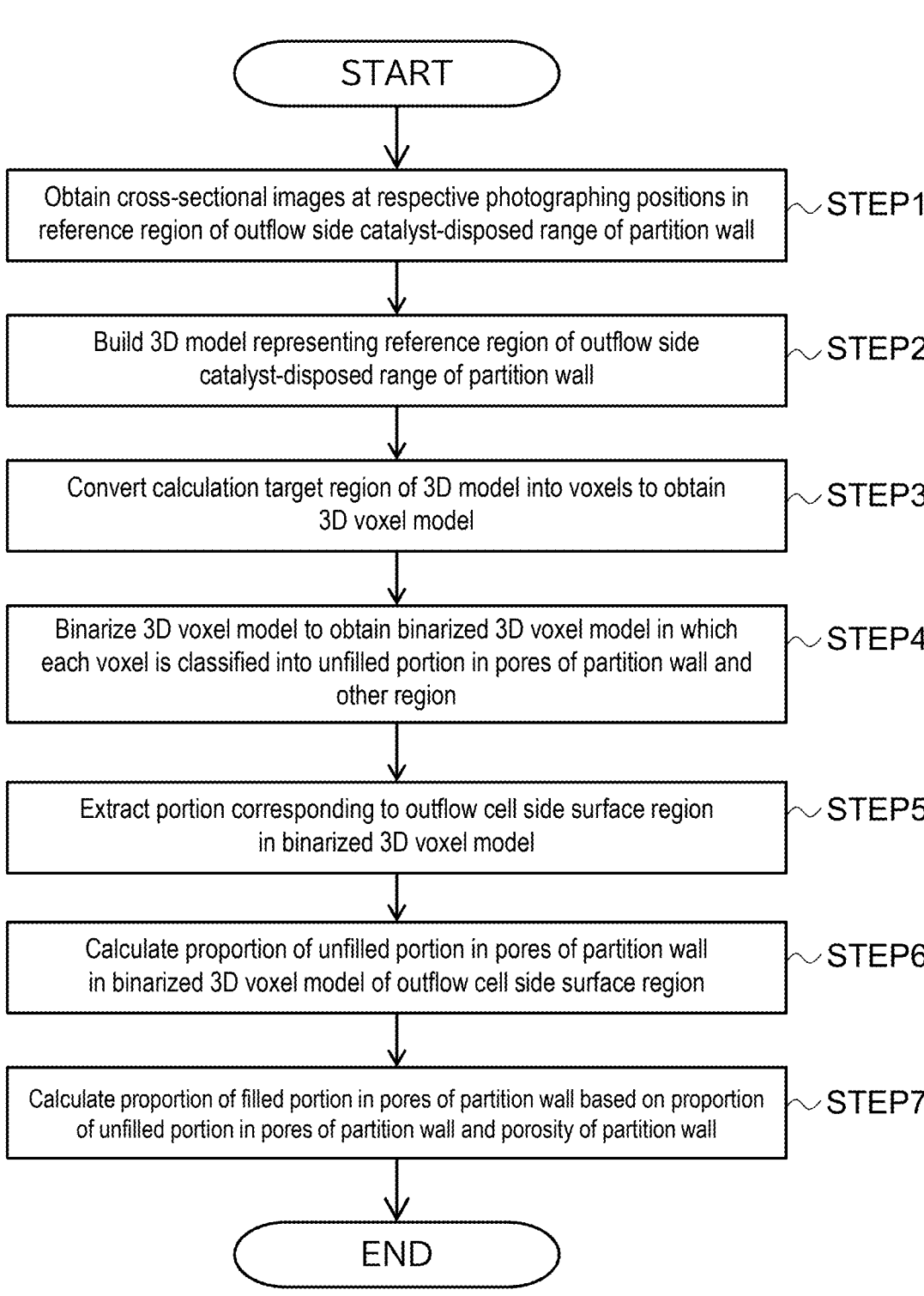
FIG. 4 is a flowchart illustrating a procedure of obtaining a proportion of a portion filled with an outflow side catalyst in pores in an outflow cell side surface region in a reference region of the outflow side catalyst-disposed range of the partition wall.

First, for the exhaust gas purification devices 1 of Examples 1 to 3 and Comparative Examples 1 and 2, the proportion of the portion filled with the outflow side catalyst 30 (filled portion) in the pores in the outflow cell side surface region 14SR in the reference region of the outflow side catalyst-disposed range 14Y of the partition wall 14 was obtained. The following describes a procedure of obtaining the proportion of the filled portion for the exhaust gas purification device 1 of each example. FIG. 4 is a flowchart illustrating a procedure of obtaining the proportion of the portion filled with the outflow side catalyst in the pores in the outflow cell side surface region in the reference region of the outflow side catalyst-disposed range of the partition wall.

In the procedure, as illustrated in FIG. 4, first, in the exhaust gas purification device 1 of each example, a region of the partition wall 14 between adjacent corners of the inflow cell 12A (outflow cell 12B) in a range of ±1 mm in the extending direction from the reference position 14c of the outflow side catalyst-disposed range 14Y of the partition wall 14 was defined as the reference region, and cross sections perpendicular to the extending direction were photographed by X-ray CT at 1000 photographing positions set at intervals of 2 μm in the extending direction in the reference region of the outflow side catalyst-disposed range 14Y of the partition wall 14, thus obtaining 1000 cross-sectional images (STEP 1). Specifically, using an X-ray CT measuring device manufactured by ZEISS (Xradia 510 Versa), and under the predetermined measuring conditions (tube voltage: 60 KV, tube current: 87.5 μA, pixel size: 2 μm), the cross sections perpendicular to the extending direction at the respective photographing positions in the reference region of the outflow side catalyst-disposed range 14Y of the partition wall 14 were photographed at 150× magnification, and each cross-sectional image was obtained in 8-bit format of 1280×960 pixels. The above-described cross-sectional image of FIG. 3 is an image indicating a cross section perpendicular to the extending direction at one photographing position (reference position) in the reference region of the outflow side catalyst-disposed range of the partition wall according to Example 1.

Subsequently, as illustrated in FIG. 4, using CAE software GEODICT (registered trademark) produced by Math2Market GmbH, the 1000 cross-sectional images were all loaded and the 1000 cross-sectional images were integrated using Import Geo module of GEODICT, thereby building a 3D (three-dimensional) model representing the reference region of the outflow side catalyst-disposed range 14Y of the partition wall 14 (STEP 2).

Subsequently, as illustrated in FIG. 4, using GEODICT, a calculation target region of 800 μm (width direction)×800 μm (extending direction)×400 μm (thickness direction), which is present at the center in the width direction and the extending direction of the reference region of the outflow side catalyst-disposed range 14Y of the partition wall 14 and covers the entire range in the thickness direction of the reference region, was extracted from the 3D model and converted into voxels of 400 voxels (width direction)×400 voxels (extending direction)×200 voxels (thickness direction), thereby obtaining a 3D voxel model representing the calculation target region (STEP 3). At this time, a three-dimensional space having the width direction in the X-axis direction, the extending direction in the Y-axis direction, and the thickness direction in the Z-axis direction was employed, and the calculation target region of the 3D model was expressed by voxels arranged in the X-axis direction, the Y-axis direction, and the Z-axis direction, thus obtaining the 3D voxel model.

Subsequently, as illustrated in FIG. 4, using Threshold menu of PoroDict module of GEODICT, by a mode method, a threshold in binarizing each voxel of the 3D voxel model was set to a predetermined value, and then each voxel of the 3D voxel model was binarized, thereby obtaining a binarized 3D voxel model in which each voxel was classified into the portion not filled with the outflow side catalyst 30 (unfilled portion) in the pores of the partition wall 14 and the other region (the substrate portion of the partition wall 14 and the outflow side catalyst 30) (STEP 4). Subsequently, as illustrated in FIG. 4, using Crop module of GEODICT, in the binarized 3D voxel model, a portion corresponding to the outflow cell side surface region 14SR in the outflow side catalyst-disposed range 14Y of the partition wall 14 was extracted, thereby obtaining a binarized 3D voxel model of the outflow cell side surface region (STEP 5). Subsequently, as illustrated in FIG. 4, using Granulometry menu of PoroDict module of GEODICT, the proportion [%] of the unfilled portion in the pores of the partition wall in the voxels that constitute the binarized 3D voxel model of the outflow cell side surface region was calculated (STEP 6).

Subsequently, as illustrated in FIG. 4, using Excel (registered trademark) produced by Microsoft Corporation, the proportion [%] of the portion filled with the outflow side catalyst 30 (filled portion) in the pores in the outflow cell side surface region 14SR in the reference region of the outflow side catalyst-disposed range 14Y of the partition wall 14 was calculated based on the proportion [%] of the unfilled portion in the pores of the partition wall in the voxels that constitute the binarized 3D voxel model of the outflow cell side surface region and the porosity of the partition wall (proportion of the pores in the partition wall alone) [%] (STEP 7). At this time, the proportion [%] of the filled portion is calculated as (porosity of the partition wall−proportion of the unfilled portion in the pores of the partition wall)/porosity of the partition wall×100. Table 1 below shows the proportion of the portion filled with the outflow side catalyst in the pores in the outflow cell side surface region in the reference region of the outflow side catalyst-disposed range of the partition wall obtained for the device of each example.

(Initial Pressure Loss)

For the exhaust gas purification devices 1 of Examples 1 to 3 and Comparative Examples 1 and 2, the initial pressure loss was measured in the state where the outflow side catalyst and the inflow side catalyst were formed on the honeycomb substrate. Specifically, as the initial pressure loss, a pressure loss [kPa] when air was caused to flow through the exhaust gas purification device 1 of each example at 7 m³/min and 20° C. was measured. Table 1 below shows the initial pressure loss obtained for the device of each example.

(Exhaust Gas Purification Performance after Durability Test)

For the exhaust gas purification devices 1 of Examples 1 to 3 and Comparative Examples 1 and 2, as an index of the exhaust gas purification performance after a durability test, a NOx conversion rate at an inlet gas temperature of 500° C. was obtained. Specifically, first, the exhaust gas purification device of each example was mounted to an exhaust system of a V8 engine, exhaust gases in respective stoichiometric and lean atmospheres were caused to flow repeatedly for a certain period of time (a ratio of 3:1) at a catalyst bed temperature of 900° C. for 50 hours, thus performing the durability test. Subsequently, the exhaust gas purification device of each example after the durability test was mounted to an exhaust system of an L4 engine (inline-four engine), an exhaust gas with A/F (air-fuel ratio) of 14.4 was supplied to increase the inlet gas temperature from 200° C. to 600° C. (20° C./minute) under the condition of Ga=28 g/s. In the temperature increase process of the inlet gas temperature, NOx concentrations of an inlet gas and an outlet gas were measured to calculate the NOx conversion rate, and the NOx conversion rate [%] at the inlet gas temperature of 500° C. was obtained. Table 1 below shows the NOx conversion rate at the inlet gas temperature of 500° C. obtained for the device of each example.

14

TABLE 1

| | Density of Outflow side catalyst [g/L] | Concentration of Acetic acid (pH adjuster) in slurry for outflow side catalyst [weight %] | Proportion of portion filled with outflow side catalyst in pores in outflow cell side surface region in reference region of outflow side catalyst-disposed range of partition wall [%] | Initial pressure loss [kPa] | NOx conversion rate (500° C.) [%] |
|---|---|---|---|---|---|
| Example 1 | 52 | 1 | 77.9 | 4.9 | 98.2 |
| Example 2 | 52 | 4 | 66.6 | 4.9 | 96.2 |
| Example 3 | 52 | 5 | 61.2 | 5.1 | 95.4 |
| Comparative Example 1 | 52 | 6 | 49.2 | 5.3 | 93.6 |
| Comparative Example 2 | 109 | 1 | 90.9 | 8.6 | 95.6 |

Figure 5:
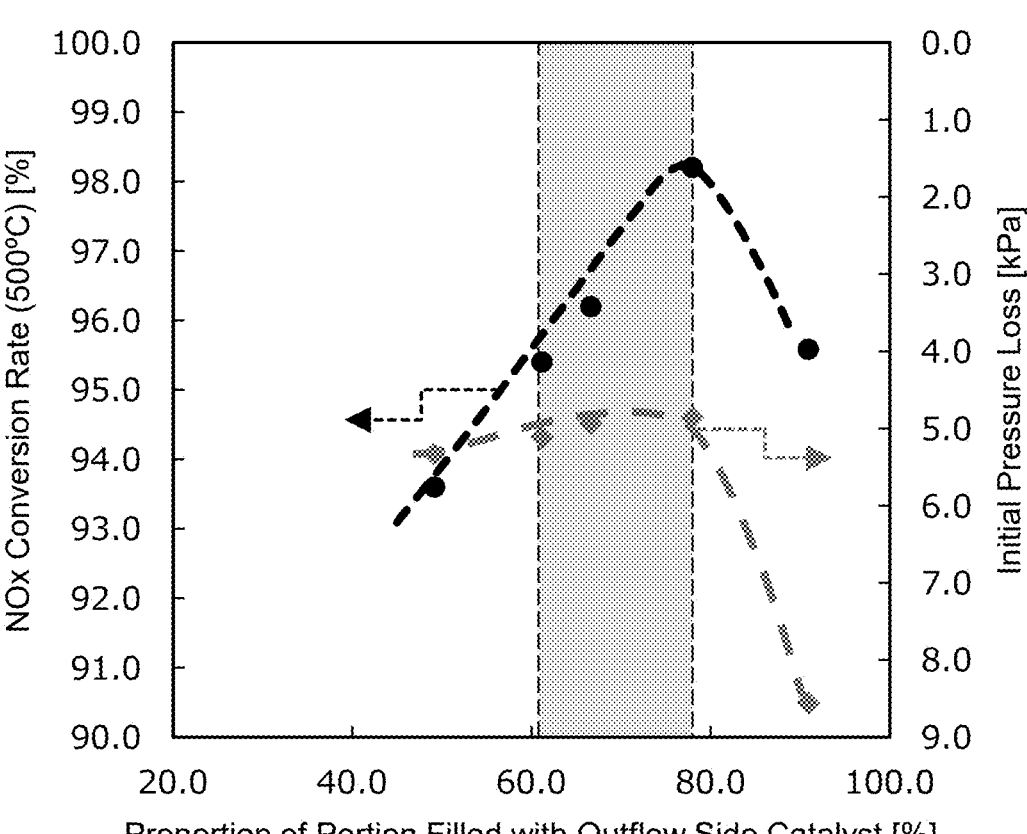
FIG. 5 is a graph showing a relation of an initial pressure loss and an NOx conversion rate at an inlet gas temperature of 500° C. to the proportion of the portion filled with the outflow side catalyst in the pores in the outflow cell side surface region in the reference region of the outflow side catalyst-disposed range of the partition wall according to exhaust gas purification devices of Examples 1 to 3 and Comparative Examples 1 and 2.

FIG. 5 is a graph showing a relation of the initial pressure loss and the NOx conversion rate at the inlet gas temperature of 500° C. to the proportion of the portion filled with the outflow side catalyst in the pores in the outflow cell side surface region in the reference region of the outflow side catalyst-disposed range of the partition wall according to the exhaust gas purification devices of Examples 1 to 3 and Comparative Examples 1 and 2. As shown in Table 1 above and FIG. 5, when the proportion of the portion filled with the outflow side catalyst is less than 61%, the NOx conversion rate decreases, and an increase in the initial pressure loss is less likely to progress even when the proportion of the portion filled with the outflow side catalyst further decreases. On the other hand, when the proportion of the portion filled with the outflow side catalyst exceeds 78%, the initial pressure loss increases significantly, and the NOx conversion rate decreases significantly.

The present disclosure is not limited to the embodiments described above, and various kinds of changes of design are allowed within a range not departing from the spirits of the present disclosure described in the claims.

All publications, patents and patent applications cited in the present description are herein incorporated by reference as they are.

DESCRIPTION OF SYMBOLS

1 Exhaust gas purification device

10 Honeycomb substrate

11 Frame portion

12 Cell

12A Inflow cell

12B Outflow cell

14 Partition wall

14NB Inner region

14Y Outflow side catalyst-disposed range

14c Reference position

14SR Outflow cell side surface region

30 Outflow side catalyst

What is claimed is:

1. An exhaust gas purification device comprising:

a honeycomb substrate; and an outflow side catalyst, wherein the honeycomb substrate includes a porous partition wall defining a plurality of cells extending from an inflow side end surface to an outflow side end surface, wherein the plurality of cells include an inflow cell and an outflow cell adjacent across the partition wall, wherein the inflow cell has an open inflow side end and a sealed outflow side end, wherein the outflow cell has a sealed inflow side end and an open outflow side end, wherein the outflow side catalyst is disposed in an inner region on the outflow cell side of the partition wall in an outflow side catalyst-disposed range extending from an outflow side end of the partition wall to a position apart toward an inflow side along an extending direction, and wherein in the outflow side catalyst-disposed range of the partition wall, 61%-78% is filled with the outflow side catalyst in pores in an outflow cell side surface region up to a depth of a quarter of a thickness of the partition wall from a surface on the outflow cell side of the partition wall.

2. The exhaust gas purification device according to claim 1, wherein the outflow side catalyst-disposed range of the partition wall is a range extending from the outflow side end of the partition wall to a position apart by a distance of 50% or more and 100% or less of a length of the partition wall in the extending direction toward the inflow side along the extending direction.

* * * * *